(12) United States Patent
Kitamura et al.

(10) Patent No.: US 9,492,903 B2
(45) Date of Patent: Nov. 15, 2016

(54) AUTOMATIC TOOL STORING MECHANISM

(71) Applicant: KITAMURA MACHINERY CO., LTD., Takaoka-shi, Toyama-ken (JP)

(72) Inventors: Akihiro Kitamura, Takaoka (JP); Kosaku Kitamura, Takaoka (JP)

(73) Assignee: KITAMURA MACHINERY CO., LTD., Takaoka-Shi (JP)

( * ) Notice: Subject to any disclaimer, the term of this patent is extended or adjusted under 35 U.S.C. 154(b) by 246 days.

(21) Appl. No.: 14/449,758

(22) Filed: Aug. 1, 2014

(65) Prior Publication Data

US 2015/0038307 A1 Feb. 5, 2015

(30) Foreign Application Priority Data

Aug. 2, 2013 (JP) .................. 2013-161112

(51) Int. Cl.
*B23Q 3/157* (2006.01)
*B23Q 3/155* (2006.01)

(52) U.S. Cl.
CPC ......... *B23Q 3/15526* (2013.01); *B23Q 3/1554* (2013.01); *B23Q 3/15713* (2013.01); *B23Q 3/15773* (2013.01); *B23Q 3/15766* (2013.01); *Y10T 483/175* (2015.01); *Y10T 483/1776* (2015.01); *Y10T 483/1783* (2015.01); *Y10T 483/1788* (2015.01); *Y10T 483/1855* (2015.01)

(58) Field of Classification Search
CPC ................. Y10T 483/1855; Y10T 483/1864; Y10T 483/1845; Y10T 483/1827; Y10T 483/1788; Y10T 483/1783; Y10T 483/1779; Y10T 483/1767; Y10T 483/175; Y10T 483/1776; Y10T 483/1771; B23Q 3/15773

USPC ........ 483/64, 65, 63, 61, 53, 51, 49, 44, 37, 483/48, 46
See application file for complete search history.

(56) References Cited

U.S. PATENT DOCUMENTS

| 7,635,327 | B1 * | 12/2009 | Liao ................... | B23Q 3/15526 483/37 |
| 7,731,644 | B2 * | 6/2010 | Muser ................ | B23Q 3/15526 483/49 |
| 8,052,588 | B2 * | 11/2011 | Amaya ................ | B23Q 3/1552 483/37 |

(Continued)

FOREIGN PATENT DOCUMENTS

| JP | 61-50743 A | 3/1986 |
| JP | 62-199333 A * | 9/1987 |

(Continued)

OTHER PUBLICATIONS

Machine Translation of Office Action dated Jun. 20, 2014 in Japanese application 2013-161112.*

(Continued)

*Primary Examiner* — Erica E Cadugan
(74) *Attorney, Agent, or Firm* — Bacon & Thomas, PLLC

(57) ABSTRACT

An automatic tool storing mechanism has a plurality of main magazines, transporting apparatus, and a tool exchanging arm. Each main magazine holds a large number of pots with tools. The transporting apparatus transports the pots with tools one by one between the main magazine and the waiting position close to the main spindle. The tool exchanging arm takes out an unused or preused pot with tool which is waiting at the waiting position and attaches it to the main spindle and also removes the used tool from the main spindle and places it in the pot.

10 Claims, 12 Drawing Sheets

(56) References Cited

U.S. PATENT DOCUMENTS

| | | | |
|---|---|---|---|
| 8,360,945 B2* | 1/2013 | Kitamura | B23Q 3/15526 483/37 |
| 2005/0277529 A1* | 12/2005 | Luscher | B23Q 3/15526 483/1 |
| 2007/0184954 A1* | 8/2007 | Muser | B23Q 3/15526 483/1 |
| 2010/0145498 A1* | 6/2010 | Uchikawa | B23Q 17/22 700/179 |
| 2012/0028771 A1 | 2/2012 | Kitamura et al. | |
| 2013/0260973 A1* | 10/2013 | Lee | B23Q 3/15526 483/64 |
| 2014/0342889 A1 | 11/2014 | Kraft et al. | |

FOREIGN PATENT DOCUMENTS

| | | | |
|---|---|---|---|
| JP | H06 741 A | | 1/1994 |
| JP | 08-187640 A | * | 7/1996 |
| JP | 09-057562 A | * | 3/1997 |
| JP | 2009-297867 A | * | 12/2009 |
| JP | 2010-253588 A | | 11/2010 |
| JP | 4972120 B2 | * | 7/2012 |
| JP | 10 2011 088 055 A1 | | 6/2013 |

OTHER PUBLICATIONS

Machine Translation of JP 2009-297867-A, which JP '867 was published Dec. 2009.*
Office Action dated Jun. 20, 2014 issued in corresponding Japanese application No. 2013-161112.
Search Report dated Dec. 15, 2014 issued in corresponding European application No. 14 17 2580.4.
Office Action dated Nov. 20, 2015 issued in corresponding European application No. 14 17 2580.4.
Office Action dated Feb. 2, 2016 issued in corresponding Chinese application No. 2014 1033 4232.

* cited by examiner

AUTOMATIC TOOL STORING MECHANISM

BACKGROUND OF THE INVENTION

1. Field of the Invention

The present invention relates to an automatic tool storing mechanism equipped with a magazine to store a large number of tools and pots.

2. Description of the Related Art

Most machine tools, especially machining centers, are equipped with an automatic tool exchanging mechanism. They recently need a large number of tools. They are provided with many magazines to store the increased tools. Each magazine stores a large number of pots which are connected by chains. Pots are provided with a variety of tools.

A conventional automatic tool exchanging device, as disclosed in Japanese Patent Laid-open Nos. 2003-291046 and 2008-155343, is composed of a magazine holding a large number of tools and pots, means for taking out a tool (held in a particular pot) from the magazine and transporting it to a waiting position, and a tool exchanging arm which exchanges the unused tool (which is waiting at the waiting position) for the used tool (which is attached to the main spindle).

The conventional automatic tool exchanging device is so designed as to take out a selected tool from those which are arranged in the magazines. This action is accomplished by grabbing the tool with claws by its V-shaped flange. The pot from which the tool has been taken out is left in the magazine, and only the tool is transported from the magazine to the waiting position.

According to the conventional method, tool transportation is accomplished by separating a tool from the pot and grabbing it with claws by its V-shaped flange. The disadvantage of this method is that a heavy or long cutting tool is liable to lean during transportation, thereby causing instability in long or fast transportation.

Moreover, the claws need high rigidity to firmly grab the tool by its V-shaped flange.

The present inventors have developed an automatic tool storing mechanism which ensures stable tool transportation without tools leaning even in the case of heavy or long cutting tools, as disclosed in Japanese Patent No. 4972120.

The automatic tool storing mechanism disclosed in Japanese Patent No. 4972120 will be described with reference to FIGS. 1 to 10.

FIG. 1 is a diagram showing how the automatic tool storing mechanism takes out an unused tool and a pot together from one magazine, transfers them to the waiting position, and exchanges the unused tool for the used tool attached to the main spindle.

FIG. 2 is a diagram showing how the automatic tool storing mechanism returns, after exchange, the used tool and the pot together to another magazine.

The pot (also called tool pot) is common to all the tools (also called tool holder).

In FIGS. 1 and 2, the first magazine 10 stores the tools 12 numbered 1 to 50 and the pot 14. (FIGS. 1 and 2 show only one tool out of 50.) The second magazine 16 stores the tools 18 numbered 51 to 100 and the pot 14. FIGS. 1 and 2 show only one tool out of 50. FIGS. 1 and 2 show only the first and second magazines.

FIG. 1(1) shows one example of the initial state. The tool 12 numbered 1, which is stored in the first magazine 10, is called out or selected by the control means (not shown).

In FIG. 1(2), the tool 12 numbered 1 (which has been called out) and the pot 14 for it are taken out together from the first magazine 10. They are transferred rightward in FIG. 1 and positioned under the pot moving arm 22.

In FIG. 1(3), the pot moving arm 22 goes down and grabs the tool 12 numbered 1 (by its V-shaped flange) and the pot 14 with its claws.

In FIG. 1(4), the pot moving arm 22 goes up so that the tool 12 numbered 1 and the pot 14 are moved to the entrance of the guide 26.

In FIG. 1(5), the tool 12 numbered 1 and the pot 14, which are held by the claws, remain at the entrance of the guide 26, and only the pot moving arm 22 goes up so that the initial state is restored.

In FIG. 1(6), the tool 12 numbered 1 and the pot 14 are moved together to the waiting position along the guide 26 while they are being held.

In FIG. 1(7), the tool exchanging arm 28 exchanges the unused tool 12 numbered 1 for the used tool 18 numbered 51, which is attached to the main spindle 30.

FIG. 1(8) shows the state in which the tool exchange has been completed.

In FIG. 2(1), the used tool 18 numbered 51 (which has been exchanged) and the pot 14 for it are moved together leftward to the entrance of the guide 26.

In FIG. 2(2), the used tool 18 numbered 51 and the pot 14 are positioned under the pot moving arm 22.

In FIG. 2(3), the pot moving arm 22 grabs the tool 18 numbered 51 (by its V-shaped flange) and the pot 14 with its claws.

In FIG. 2(4), the pot moving arm 22 goes up to its initial position while it grabs the tool 18 numbered 51 (by its V-shaped flange) and the pot 14 with its claws.

In FIG. 2(5), the pot moving arm 22 moves to the position for the second magazine 16 while it is grabbing the tool 18 and the pot 14.

In FIG. 2(6), the pot moving arm 22 goes down to the returning position for the tool 18 numbered 51 in the second magazine 16 while it is grabbing the tool 18 and the pot 14.

In FIG. 2(7), only the pot moving arm 22 goes up, away from the tool 18 and the pot 14, to the position for the initial state.

In FIG. 2(8), the tool 18 numbered 51 is returned, together with the pot 14, to the second magazine 16. As the result, the entire system restores its initial state.

FIGS. 3 to 8 show one example of the automatic tool storing mechanism which has been illustrated in FIGS. 1 and 2.

It has a plurality of magazines (say, five magazines numbered 10, 16, 40, 46, and 50) of the same structure, which are arranged in a line in the longitudinal direction.

Each magazine (10, 16, 40, 46, or 50) is rotatably arranged so that the pots 14, which are common to them, make a circle endlessly. Each pot 14 is provided with a variety of tools 12 and 18 (only for illustration in FIGS. 1 and 2).

The total number of the pots 14 that can be stored in all the magazines may be several hundreds (say, 300).

The specific pot 14 provided with the tools 12 and 18 is selected (or called out) by the control device (not shown), and then it is transferred from the position 90 close to the magazine (shown in FIG. 4) to the waiting position 100 close to the main spindle by the transporting means (mentioned later).

The guide for pot transportation is comprised of the first guide part 51 and the second guide part 26. The former, which is close to the magazines, is positioned in front of each magazine, and the latter is positioned between the former and the waiting position 100.

The pot moving means has first driving means and second driving means, and the pot moving arm 22. The first driving means 55 (which is preferably a hydraulic cylinder) moves the pot provided with tools horizontally between the first guide part 51 and each magazine. The second driving means 101 (which preferably includes a ball screw and a servo motor) moves the pot provided with tools horizontally along the second guide part 26. The pot moving arm 22 moves the pot with tools vertically between the first guide part 51 and the second guide part 26.

As shown in FIG. 5, the automatic tool storing mechanism has the two rail-like guides 61 for the pot moving arm which run parallel horizontally on both sides thereof. Along the guide 61 are arranged other magazines in a line.

The pot moving arm 22 is moved up and down by the vertical driving part 71.

It is moved horizontally to the position of the selected magazine along the two guides 61 for the pot moving arm by the running driving part 77 (which preferably contains a reducer and a servo motor) through the two belts 73 and 75 extending on both side of the automatic tool storing mechanism.

The first guide part 51 is positioned as desired in the longitudinal and lateral directions by the two guides 61 for the pot moving arm 22.

This is explained with reference to FIG. 6.

Of the many tools stored in the first magazine 10, the tool 12 numbered 1 is selected (called out) by the control device (not shown). The tool 12 numbered 1 and the pot 14 for it are pushed out together from the first magazine 10 by the hydraulic cylinder 55 installed at the pot entrance and exit of the magazine 10. It is transferred rightward (in FIG. 6) along the first guide part 51. At this time, the pot 14 is held by the pot holding part 59 by the action of the pot lock cylinder 57 until the tool 12 numbered 1 and the pot 14 for it reaches the position under the pot moving arm 22.

Then, the pot moving arm 22 is lowered. The V-shaped flange of the tool 12 numbered 1 is grabbed by the claw 22a and two parts of the pot 14 are grabbed by the claws 22b and 22c.

The symbol 103 denotes the pot lock cylinder to lock and hold the tool and the pot 14 with the claws 22a, 22b, and 22c.

With the pot lock cylinder 103 activated (in its lock state), the pot moving arm 22 is raised and the tool 12 numbered 1 and the pot 14 are moved together to the entrance of the second guide part 26.

At the entrance of the second guide part 26, the pot holding part 65 holds the pot 14 by the action of the pot lock cylinder 105. With the pot 14 held, the pot 14 and the tool 12 contained therein are transferred to the waiting position 100 by the second driving means 101.

After the unused tool 12 numbered 1 and the pot 14 have reached the waiting position 100, the tool exchanging arm 28 is activated. The paired holding parts 28a and 28b turn to exchange the unused tool 12 numbered 1 for the used tool 18 numbered 51 attached to the main spindle 30. In other words, it detaches the tool 12 numbered 1 from the pot 14 and removes the tool 18 numbered 51 from the main spindle 30 and then it turns them through 180° and attaches the tool 12 numbered 1 to the main spindle 30 and places the tool 18 numbered 51 in the pot 18.

The used tool 18 numbered 51 and the pot 14 are transferred to the prescribed magazine along the guide, as shown in FIG. 2. At this time, the pot lock cylinders 103 and 105, the pot moving arm 22, the holding parts 59 and 65, the hydraulic cylinder 55, and others are activated in the order which is reverse to the order in which the pot 14 is transported to the waiting position 100.

SUMMARY OF THE INVENTION

If such a magazine as the magazine 50 which is placed far from the waiting position 100 of the tool and pot for the tool exchange arm 28 is taken out, the transfer time to the waiting position 100 after the indexing of it is large, because the distance from the magazine 50 to the waiting position 100 is large.

It is an object of the present invention to provide an automatic tool storing mechanism in which a sub magazine for the provisional or tentative storing purpose is provided near or close to the waiting position 100 with respect to a tool exchange arm 28 in addition to a plurality of main magazines, wherein a desired pot with tool is tentatively transferred from the main magazine to the sub magazine, and thereafter the desired tool and pot provisionally stored in the added sub magazine is taken out and then transferred from the sub magazine to the waiting position 100 for the exchange arm 28, so that the transfer time after the indexing of the desired tool and pot provisionally stored in the sub magazine can be shortened or reduced.

A large number of pots with tools are stored in a plurality of main magazines which are arranged in a line or one row. By means of a control means, a desired pot with tool is selected among the large number of pots with tools, and then transported into a sub magazine for the provisional or tentative storing. For example, several pots with tools may be provisionally stored in the sub magazine. Further, a desired pot with tool is selected among the plura pots with tools provisionally stored within the sub magazine, and then transferred to the waiting position for the tool exchange arm.

Preferably, the sub magazine has a tool storing function with fixed addresses, like the main magazines. Several pots within the sub magazine may be used to hold provisionally or tentatively the tools which are transported from the main magazines. For example, the number of the pots provisionally stored in the sub magazine may be a few. As a result, the pot transfer time from the sub magazine to the waiting position can be shortened so as to reduce the exchange time of the tools, if the sub magazine is added according to the present invention, by comparing with the conventional automatic tool storing mechanism without any sub magazine between the main magazines and the waiting position for the tool exchanger arm. The selecting time of a desired tool near the waiting position can be reduced.

The sub magazine may function as a waiting station.

The total transportation efficiency of the pots with tools from the main magazines to the sum magazines can be improved.

The preferred modes of the present invention may be as follows:

(1) An automatic tool storing mechanism comprising:
a plurality of main magazines for holding a number of pots with tools;
transporting means for transporting the pots with tools one by one between the position close to the main magazines and a waiting position close to a main spindle; and
a tool exchanging arm which takes out a preused or unused tool from the pot waiting at the waiting position and attach it to the main spindle and remove a used tool from the main spindle and place it in the pot.

The improvement is as follows:

a sub magazine tentatively storing a plurality for storing provisionally or of pots with tools is added between the main magazines and the waiting position close or near the main spindle, wherein the pots with tools which are taken off or removed from the main magazines and transported to the sub magazine, and wherein the pots with tools are transported one by one from the sub magazine to the waiting position.

(2) The above-stated automatic tool storing mechanism wherein the transporting means comprises:

a pair of first guide part and second guide part which are provided between the main magazine and the sub magazine; and a third guide part which is provided between the sub magazine and the waiting position close to the main spindle.

(3) The above-stated automatic tool storing mechanism, wherein the pots with tools stored in the main magazines are transported along the first and second guide parts placed between the main magazines and the sub magazine to the sub magazine, wherein the pots with tools provisionally stored in the sub magazine is transported along the third guide part placed between the sub magazine and the waiting position to the waiting position.

(4) The above-stated automatic tool storing mechanism, wherein the transporting means comprises a pot moving means, wherein the pot moving means comprises a hydraulic cylinder which moves the pot with tool between the first guide part and the main magazine, and a ball screw and a servo motor to move the tool-mounted pot.

(5) The above-stated automatic tool storing mechanism, wherein the pot moving means comprises a pot moving arm which moves the pot with tool between the first guide part and the second guide part.

(6) The above-stated automatic tool storing mechanism in which a plurality of main magazines are arranged side by side along a guide for the pot moving arm and which has a means to drive the pot moving arm on the guide for the pot moving arm, such that it stops the pot moving arm at one selected main magazine and moves the tool-mounted pot between the main magazine and the first guide part.

(7) The above-stated automatic tool storing mechanism in which the total number of the pots housed in the main magazines is several hundreds.

(8) The above-stated automatic tool storing mechanism, wherein the pot moving arm runs along the guide for the pot moving arm with the help of belts.

(9) The above-stated automatic tool storing mechanism, wherein the pot moving arm comprises claws to grab the pot and claws to grab the tool.

BRIEF DESCRIPTION OF THE DRAWINGS

The conventional automatic tool storing mechanism and embodiments of the present invention will be described in detail based on the following figures, wherein.

DESCRIPTION OF THE EMBODIMENTS

Figure 1:
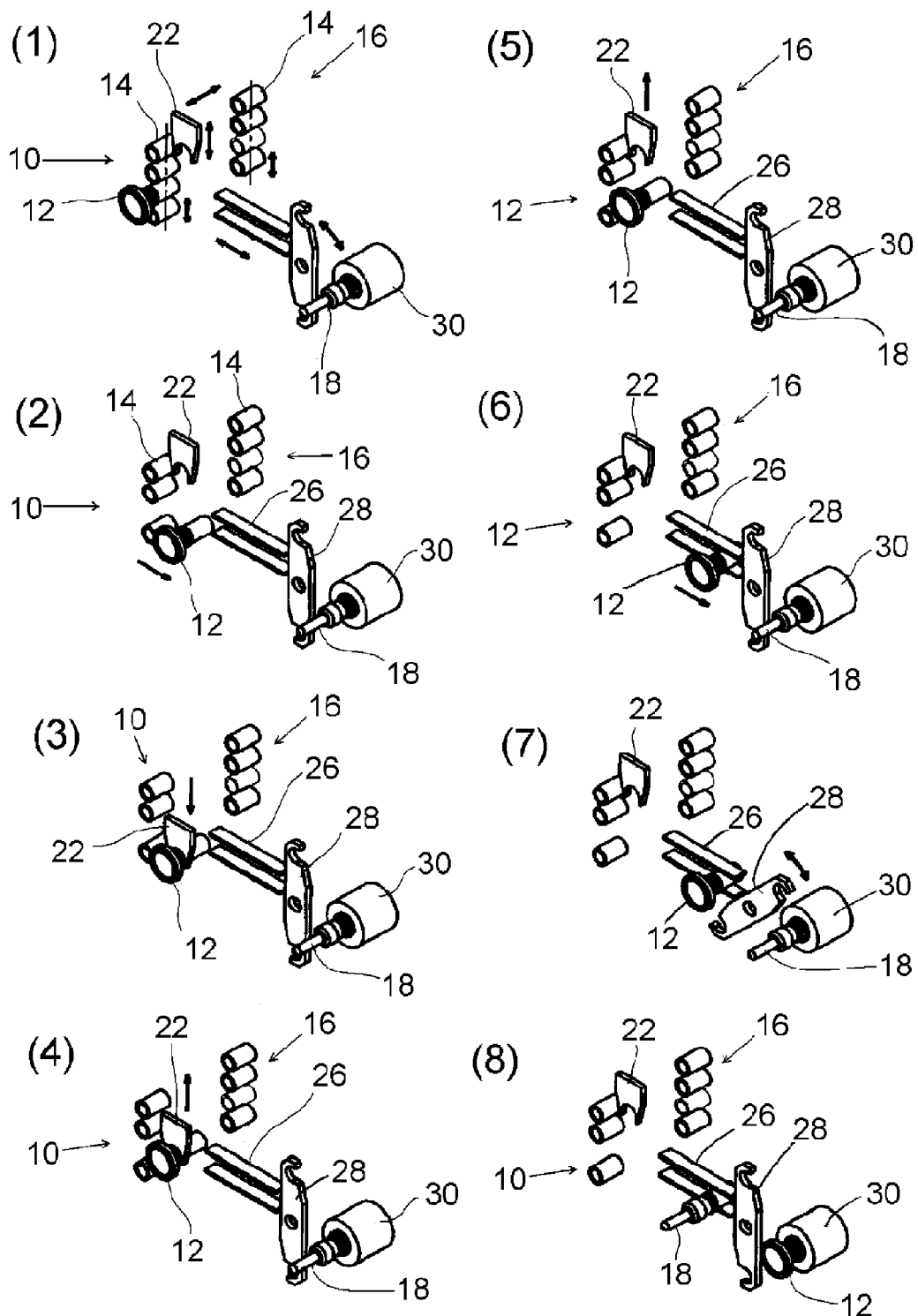
FIG. 1 is a diagram illustrating how the conventional automatic tool storing mechanism transfers the tool and pot from the first magazine to the waiting position.
Figure 2:
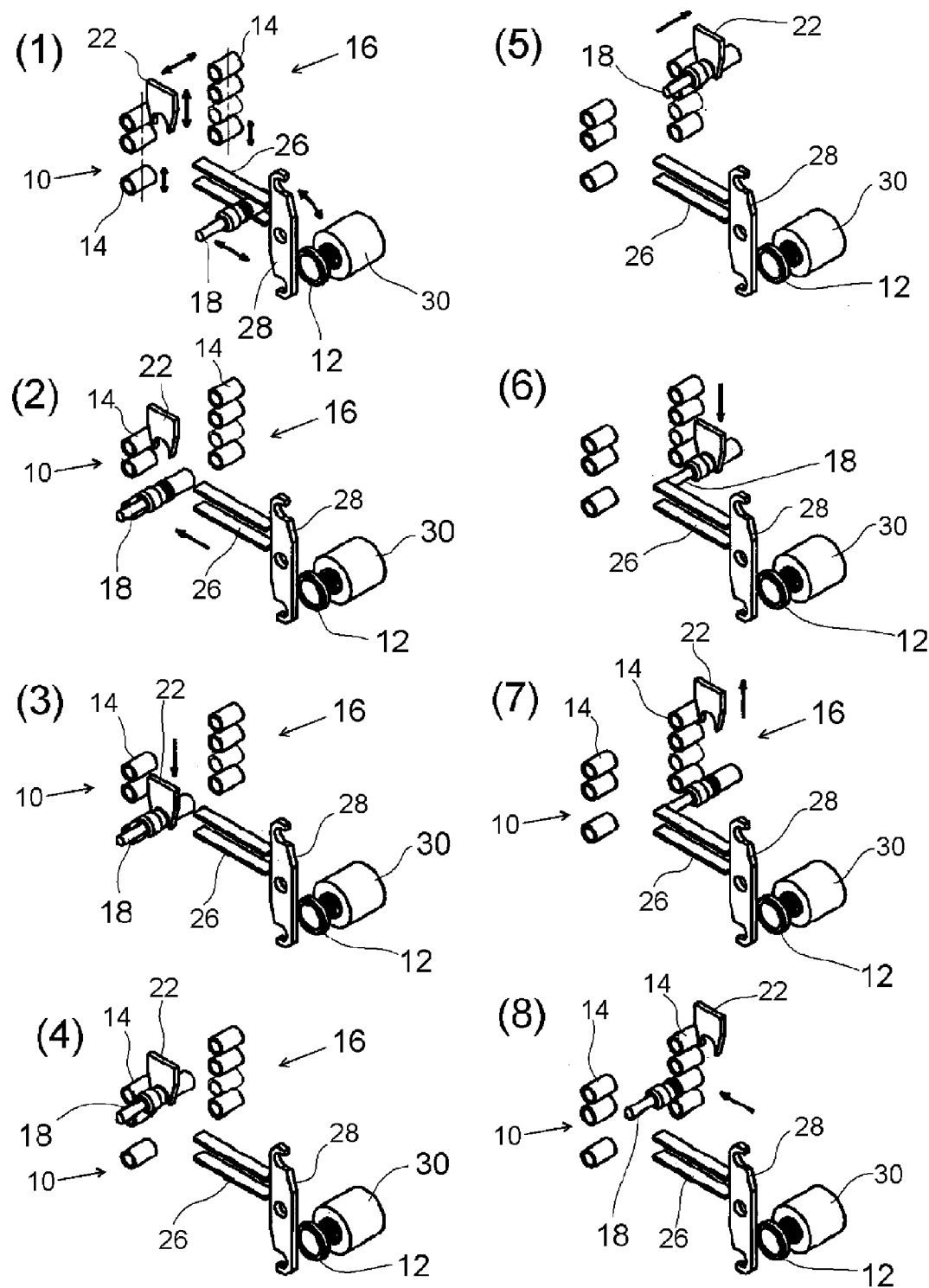
FIG. 2 is a diagram illustrating how the automatic tool storing mechanism shown in FIG. 1 transfers the tool and pot from the waiting position to the second magazine.
Figure 3:
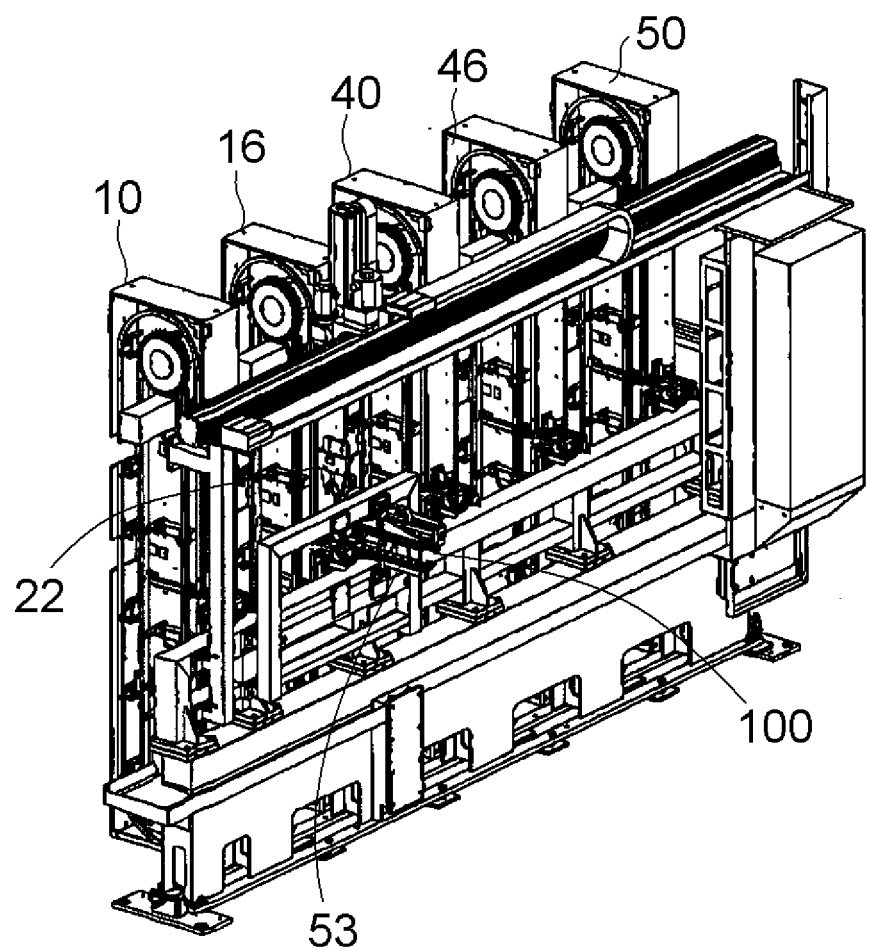
FIG. 3 is a schematic perspective view of the conventional automatic tool storing mechanism.
Figure 4:
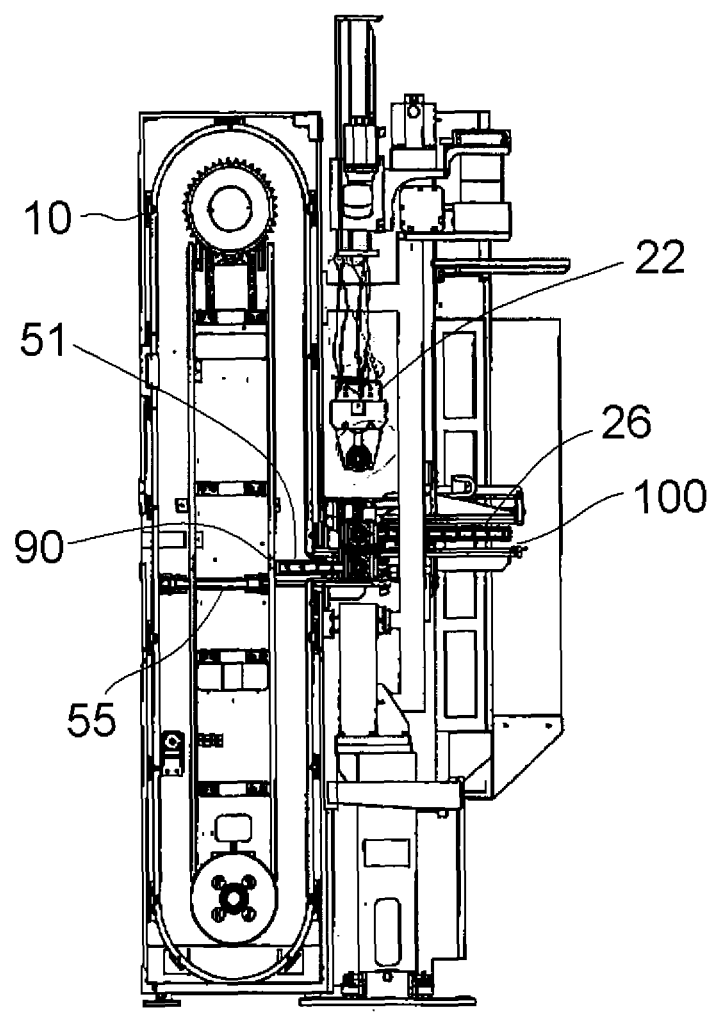
FIG. 4 is a diagram illustrating the relation between one magazine and the transporting means of the automatic tool storing mechanism shown in FIG. 3.
Figure 5:
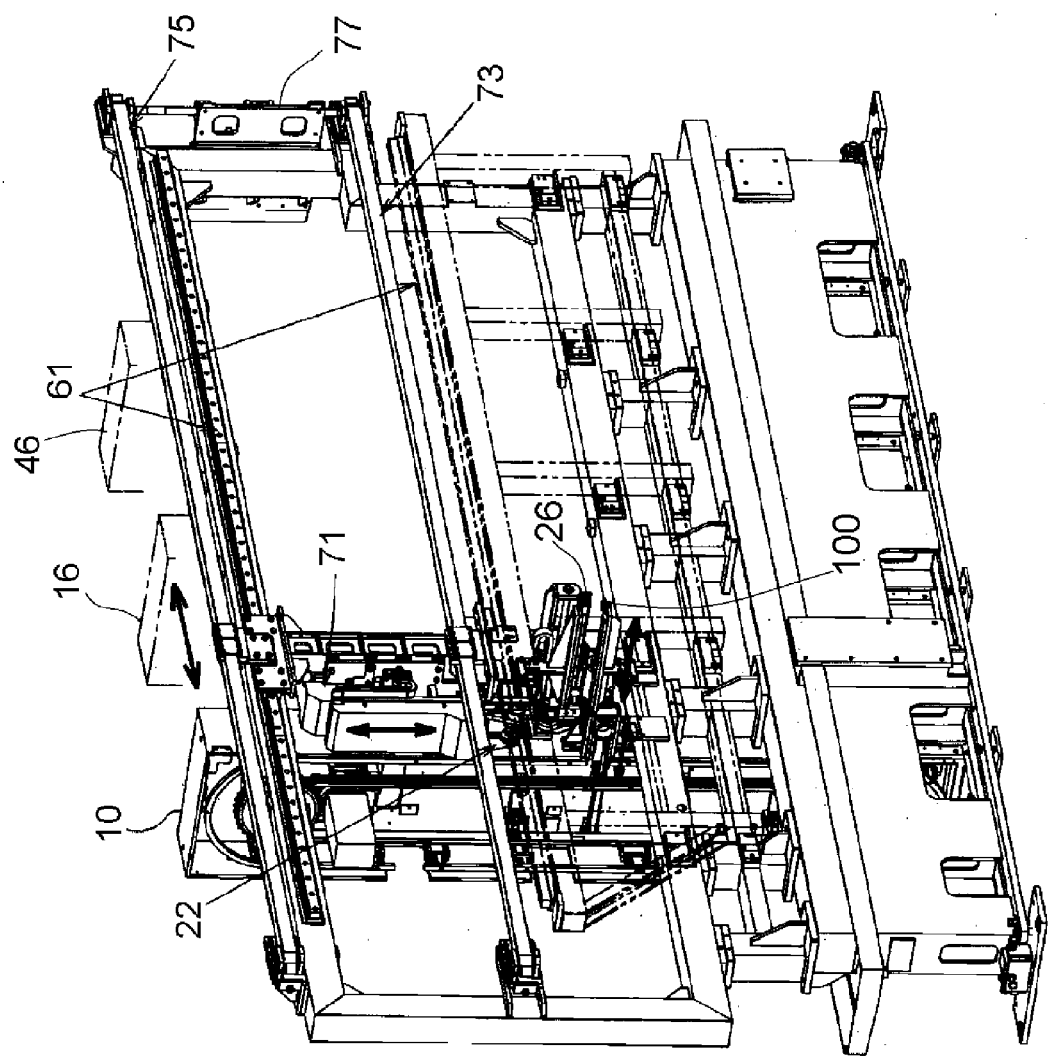
FIG. 5 is a slightly enlarged schematic perspective view of the automatic tool storing mechanism shown in FIG. 3.
Figure 6:
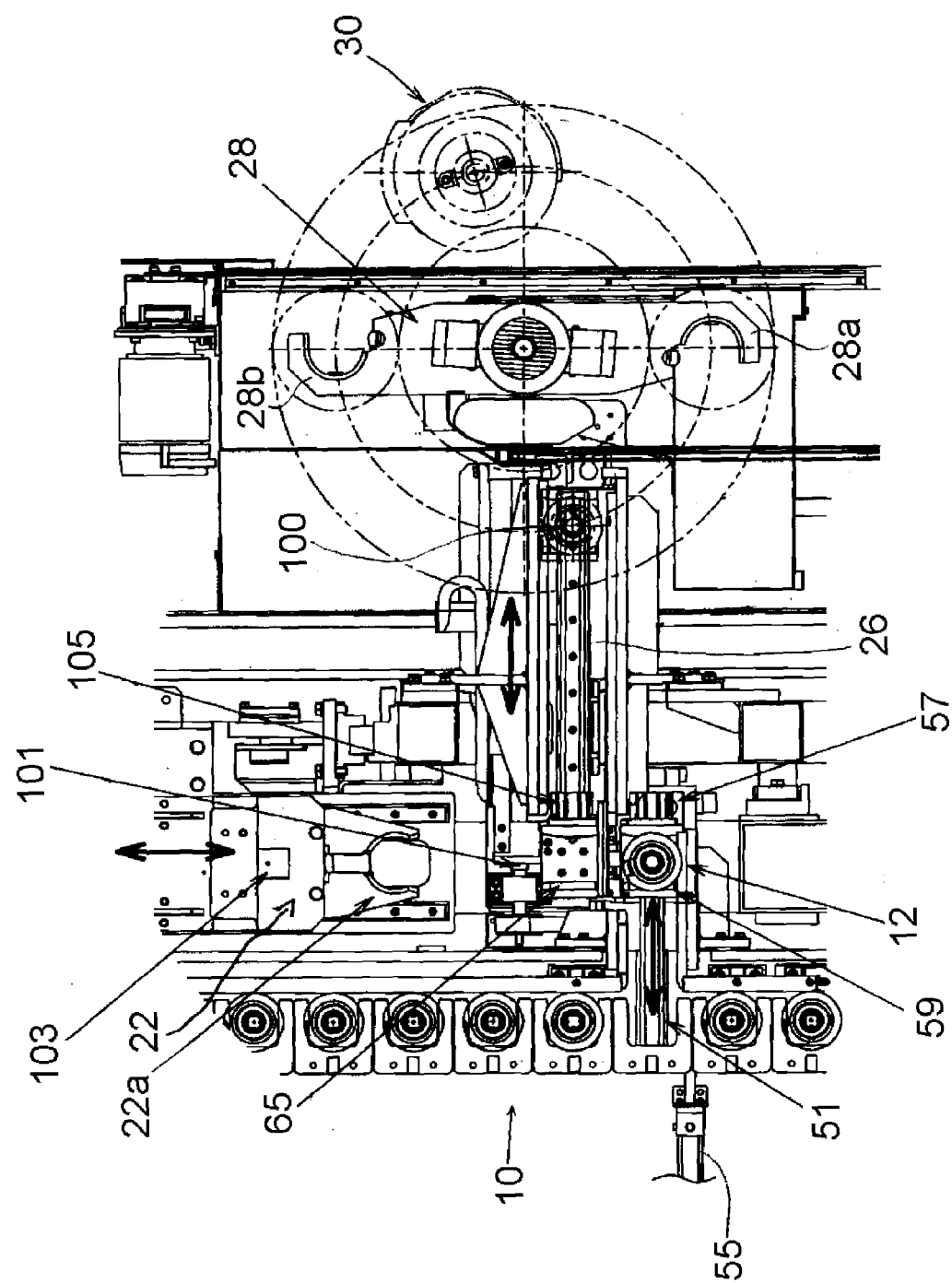
FIG. 6 is a slightly enlarged schematic view of the automatic tool storing mechanism shown in FIG. 3.
Figure 7:
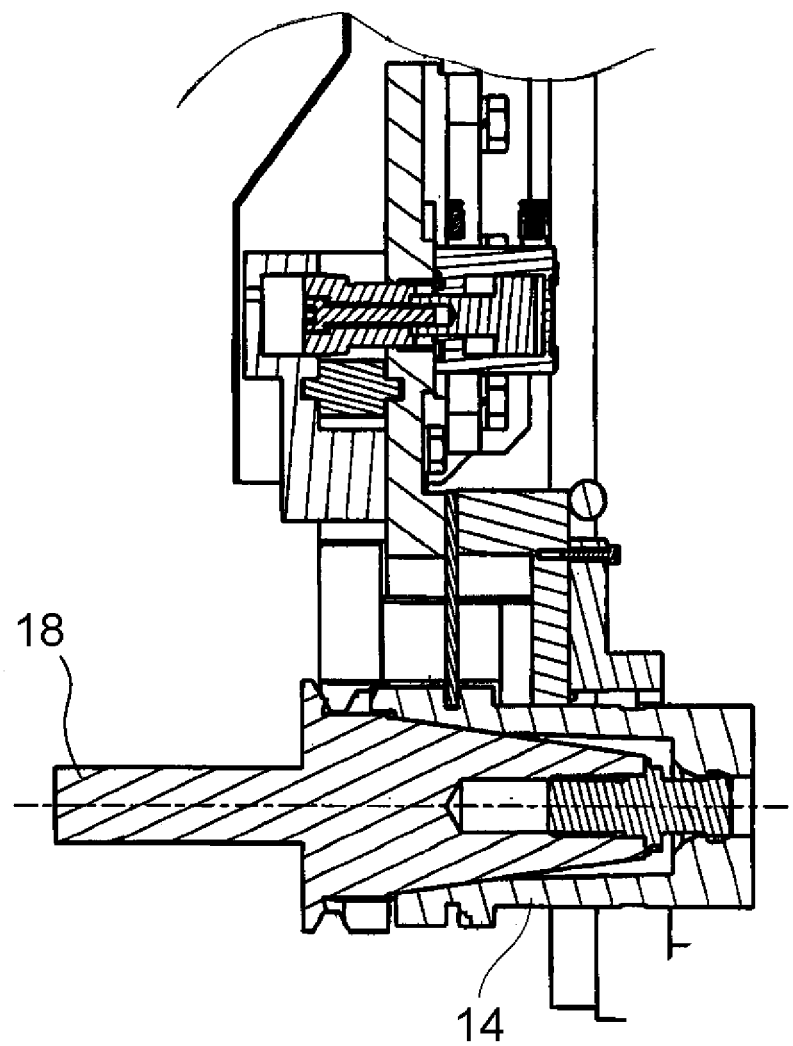
FIG. 7 is a diagram showing the relation between the pot moving arm and the claws and between the tool and the pot in the automatic tool storing mechanism shown in FIG. 3.
Figure 8:
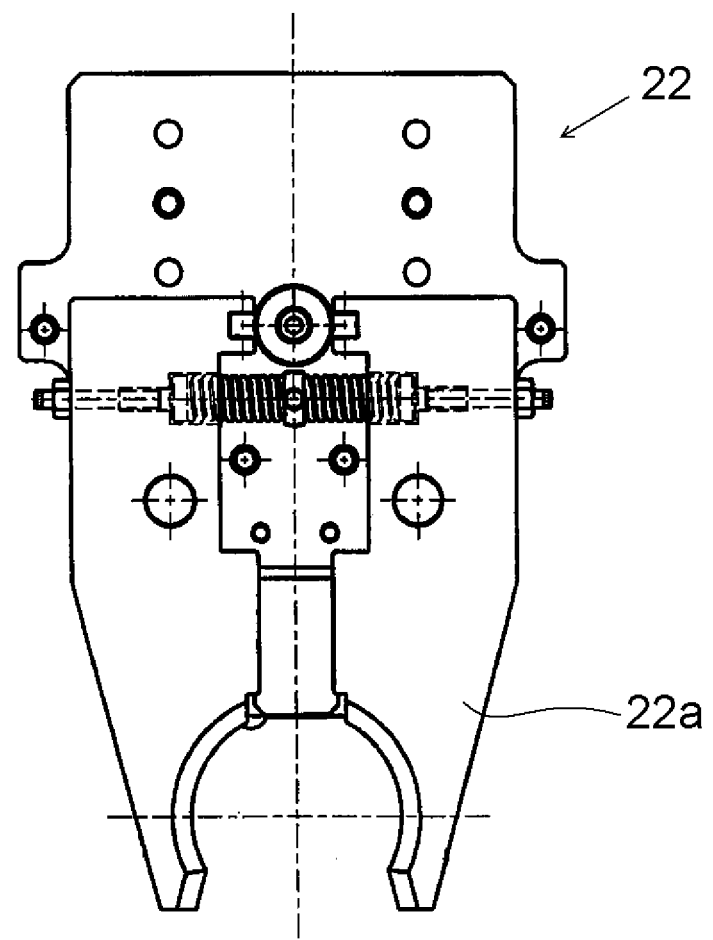
FIG. 8 shows the paired claws of the pot moving arm shown in FIG. 7.
Figure 9:
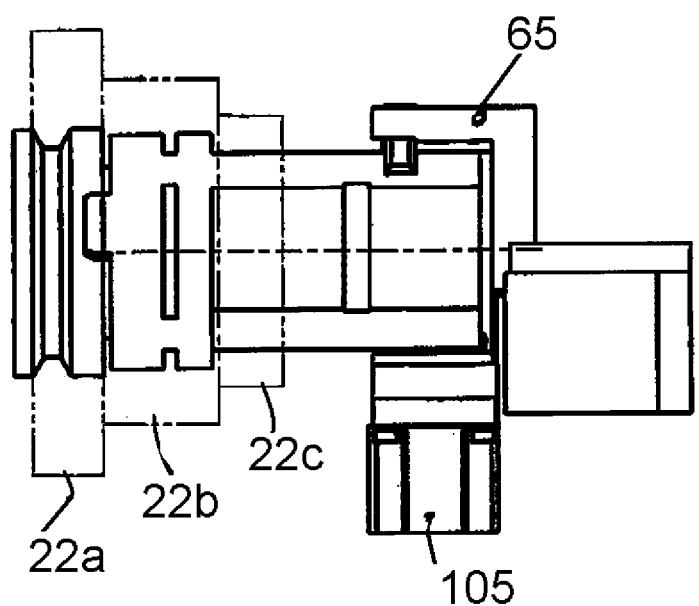
FIG. 9 is a schematic top view showing the three pairs of claws of the pot moving arm shown in FIG. 7.
Figure 10:
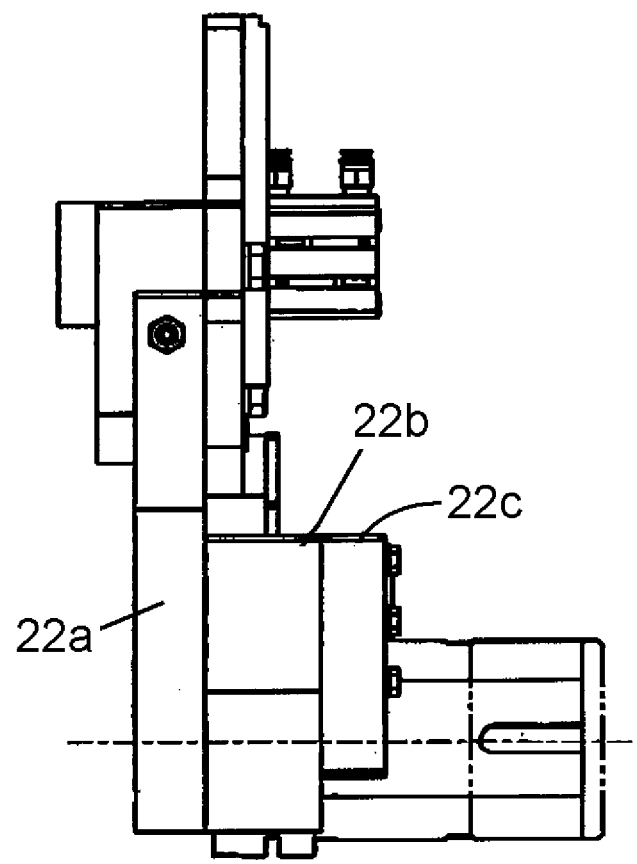
FIG. 10 is a schematic side view showing the three pairs of the pot moving arm shown in FIG. 7.
Figure 11:
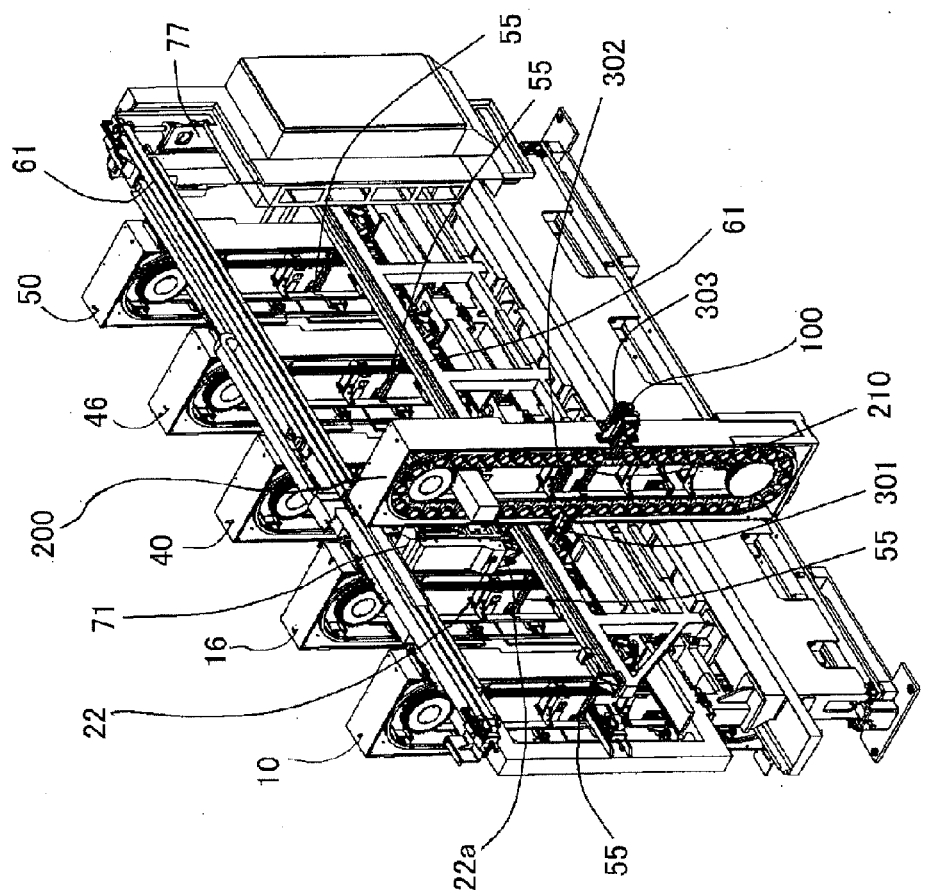
FIG. 11 is a schematic perspective view showing a main part of the automatic tool storing mechanism according to one embodiment of the present invention.

FIG. 11 is a schematic perspective view showing a main part of the automatic tool storing mechanism according to one embodiment of the present invention.

Figure 12:
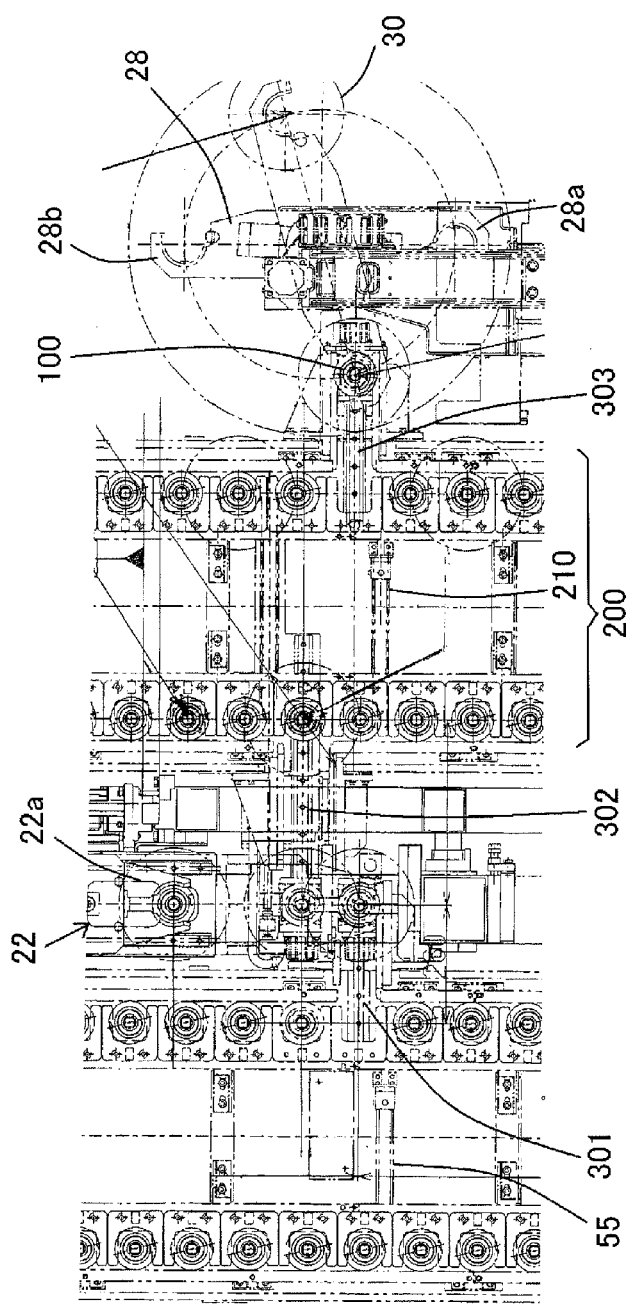
FIG. 12 is a diagram showing in detail the main part of the automatic tool storing mechanism shown in FIG. 11.

The conventional automatic tool storing mechanism shown in FIGS. 1 to 10 will be compared with the automatic tool storing mechanism shown in FIGS. 11 to 12 according to the present invention.

Five magazines 10, 16, 40, 46, 50, which are arranged in a line or one row, are called "main magazines". Regarding the five main magazines, two guides 61, and pot moving arm 22, there are no substantial differences between the conventional automatic tool storing mechanism and the automatic tool storing mechanism according to the present invention.

In the conventional automatic tool storing mechanism, no sub magazine for the provisional storing purpose is provided.

According to the present invention, a sub magazine 200 for the provisional storing purpose is additionally provided between the waiting position 100 near or close to the main spindle and the pot movement arm 22 which moves along the two guides 61.

In the present invention, a plurality of (for example five) main magazines 10, 16, 40, 46, 50 which have the same basic construction are arranged in a line or one row. In addition, the sub magazine 200 for the provisional or tentative storing purpose is provided near the waiting position 100.

In each of the main magazines 10, 16, 40, 46, 50 and the sub magazine 200, many pots 14 common to them are arranged to circulate or move around in an endless form. One of various tools (for example, 12 or 18) is attached to each of the pots 14.

The total number of pots 14 to be stored in the main magazines 10, 16, 40, 46, 50 and the sub magazine 200 may be several hundreds (for example, 300).

The specific pot 14 is selected among the pots stored in the main magazine by means of control means (not shown) to be taken out, and then transported from the main magazine side 90 (see FIG. 4) to the sub magazine 200 for the provisional storing purpose, where it is provisionally stored in the best position thereof (the specific address of each tool) and waited. If desired, it is transferred to the waiting position 100 near or close to the main spindle. For the purpose of transferring pots, a first guide part 301 is provided at the side of the main magazines so as to position the pots in front of each selected main magazines. A second guide part 302 is provided in position between the first guide part 301 and the sub magazine 200.

The pot moving means comprises a first actuation or driving means (preferably hydraulic cylinder 55) which moves in a horizontal direction the pots with the tools between the first guide part 301 and each of the main magazines 10, 16, 40, 46, 50, a second actuation or driving means 101 (see FIG. 6, for example a ball screw and a servo motor), which moves in a horizontal direction the pots with the tools along the second guide means 302, and the pot moving arm 22 which moves in a vertical direction the pots with the tools between the first guide part 301 and the second guide part 302.

As best shown in FIG. 11, two rail-shaped guides 61 for running of the pot moving arm 22 is arranged between both end sides of the automatic tool storing mechanism in a horizontal direction in parallel. The plurality of main magazines are provided in one row or a line.

The pot moving arm 22 moves up and down in a vertical direction by means of the elevating means 71.

Via two belts 73, 75 (see FIG. 5) extending between both end sides of the automatic tool storing mechanism, by means of the driving means 77 for the running purpose which includes preferably a reduction gear means and a servo motor, the pot moving arm 22 is transferred in a horizontal direction and stopped at the selected main magazine.

A first guide part 301 may be set in a desired vertical and lateral positions by means of the running guide 61 and the pot moving arm 22.

For example, the fifth main magazine 50 which is placed far from the waiting position 100 close to the main spindle 30 will be explained among many tools stored in the fifth main magazine, a desired tool 12 is selected by the control means (not shown). The selected tool 12 and the pot 14 for it are pushed out together by means of a hydraulic cylinder provided in the position for entrance and exit of the pots in the fifth main magazine 50, and then transported along the first guide part 301. Until the tool 12 and the pot 14 for it comes in a position under the pot moving arm 22, the pot 14 is held by a pot holding means 59 due to the operation of a pot lock cylinder 57 (see FIG. 6).

Next, the pot moving arm 22 moves down, and then a claw 22a holds the v-shaped flange of the tool 12, while another claws hold the pot 14 in two positions.

The pot lock cylinder 103 locks the tool 14 and the pot 14 by means of the claws to be held in position. While the pot lock cylinder 103 is actuated to lock them, the pot moving arm 22 moves up, the tool 12 and the pot 14 together are transported to the entrance of the second guide part 302. The pot holding means 65 holds the pot 14 by the function of the pot lock cylinder 105 at the entrance of the second guide part 302. While the pot 14 is held, the pot 14 and the tool 12 attached to it is transferred to a desired place of the sub magazine 200 along the second guide part 302 by means of the second actuation means.

The plurality of pots 14 with tools which are transported from the main magazines 10, 16, 40, 46, 50 are provisionally or tentatively stored in the sub magazine 200. One among the pots 14 with tools is selected by the control means (not shown), and pushed out from the sub magazine 200 by means of the hydraulic cylinder 210 placed at the entrance and exit of the sub magazine 200, and thereafter transferred to the waiting position 100 along a third guide part 303.

After the preused or non used tool 12 and the pot 14 for it come to the waiting position 100, the tool exchange arm 28 is actuated, so that the pair of holding means 28a, 28b are turned, and then the pre-used tool 12 being in the waiting position 100 and the used tool 18 attached to the main spindle 30 are exchanged to each other. That is, the pre-used tool 12 is taken out from the pot 14, while the used tool is taken out from the main spindle 30. After that, they are turned by 180 degrees, and then the pre-used tool 12 is attached to the main spindle 30, while the used tool 18 is attached to the pot 18.

The used tool 18 and the pot 14 for it are transported along the second guide part 302 and the first guide part 301. They are actuated by the pot lock cylinders 103, 105, the pot moving arm 22, the holding means 59, 65, the hydraulic cylinder 55 and others so that they move back from the sub magazine 200 to the predetermined main magazine in a reverse order in comparison when they came from the main magazine to the sub magazine 200.

Preferably, the sub magazine has a tool storing function with fixed addresses, like the main magazines. Several pots within the sub magazine may by used to hold provisionally or tentatively the tools which are transported from the main magazines. For example, the pots provisionally stored in the sub magazine may be a few pots. As a result, the pot transfer time from the sub magazine to the waiting position can be shortened so as to reduce the exchange time of the tools, if the sub magazine is added according to the present invention, by comparing it with the conventional automatic tool storing mechanism without any sub magazine between the main magazines and the waiting position for the tool exchange arm.

What is claimed is:

1. An automatic tool storing mechanism comprising:
a plurality of main magazines for holding a number of pots, each said pot provided with a respective tool;
transporting means for transporting one of the pots provided with a respective one of the tools, called a tool-mounted pot, one by one, between a main-magazine-side position proximal to the main magazines and a waiting position distal to the main magazines and proximal close to a main spindle, the main spindle being spaced from the main magazines in a first direction;
a tool exchanging arm which takes out a preused or unused tool from the one pot when the one pot is waiting at the waiting position and attaches the unused tool to the main spindle and removes a used tool from the main spindle and places the used tool in the one pot, and
a sub magazine temporarily storing a plurality of pots, each said pot provided with a respective tool, the sub-magazine located between the main magazines and the waiting position, wherein pots with tools are taken out or removed from the main magazines and are transported to the sub magazine, and wherein the pots with tools are transported, one by one, from the sub magazine to the waiting position;
wherein the transporting means comprises:
a first linear guide having a longitudinal axis extending in the first direction, the first linear guide being proximal to the main magazines, and being configured to guide the tool-mounted pot from a position proximal to the main magazines and in the first direction to a first pot-transfer position;
a pot moving means comprising a pot moving arm for transferring the tool-mounted pot in a second direction, orthogonal to the first direction, from the first pot-transfer position to a second pot-transfer position;

a second linear guide which guides the tool-mounted pot from the second pot-transfer position to the sub-magazine, the second linear guide having a longitudinal axis extending in the first direction, the second linear guide being offset from the first linear guide in the second direction; and a third guide, located between the sub-magazine and the waiting position, configured to guide the tool-mounted pot from the sub-magazine to the waiting position.

2. The automatic tool storing mechanism according to claim 1, wherein the first guide and the second guide are located between the main magazines and the sub magazine.

3. The automatic tool storing mechanism according to claim 1, wherein the pots, each provided with a respective tool, that are stored in the main magazines are transported along the first guide and the second guide, wherein the pots, each provided with a respective tool, that are temporarily stored in the sub magazine are transported along the third guide to the waiting position.

4. The automatic tool storing mechanism according to claim 1, wherein the pot moving means further comprises a hydraulic cylinder for moving the tool-mounted pot between the first guide and the main magazines, and also further comprises a ball screw and a servo motor to move the tool-mounted pot.

5. The automatic tool storing mechanism according to claim 4, wherein the ball screw and servo motor move the tool-mounted pot along the second guide.

6. The automatic tool storing mechanism according to claim 1, wherein the pot moving arm moves the tool-mounted pot between the first guide and the second guide.

7. The automatic tool storing mechanism according to claim 6, wherein the plurality of main magazines are arranged side by side along a guide for the pot moving arm, the automatic tool storing mechanism further comprising a means to drive the pot moving arm on the guide for the pot moving arm, such that the pot moving arm is stopped at one selected one of the main magazines and such that the tool-mounted pot is moved between the one main magazine and the first guide.

8. The automatic tool storing mechanism according to claim 7, in which the total number of the pots housed in the main magazines and the sub-magazine is three hundred.

9. The automatic tool storing mechanism according to claim 7, wherein the means to drive the pot moving arm on the guide for the pot moving arm includes belts.

10. The automatic tool storing mechanism according to claim 7, wherein the pot moving arm comprises claws configured to grab a respective one of the pots and comprises further claws configured to grab the tool mounted in the respective one pot.

* * * * *